United States Patent [19]
Gerbier et al.

[11] 3,928,072
[45] Dec. 23, 1975

[54] AIR DEPOLARIZED ELECTRIC CELL

[75] Inventors: Gerard Gerbier; Pierre Depoix, both of Poitiers, France

[73] Assignee: Saft-Societe des Accumulateurs Fixes et de Traction, Romainville, France

[22] Filed: July 18, 1974

[21] Appl. No.: 489,603

[30] Foreign Application Priority Data
Aug. 1, 1973 France............................. 73.28166
May 6, 1974 France............................. 74.15618

[52] U.S. Cl............................................. 136/86 A
[51] Int. Cl.². ......................................... H01M 29/04
[58] Field of Search .......... 136/86 A, 135 P, 135 R, 136/107, 13, 14, 157

[56] References Cited
UNITED STATES PATENTS

| | | | |
|---|---|---|---|
| 2,097,077 | 10/1937 | Oppenheim...................... | 136/86 A |
| 2,938,064 | 5/1960 | Kordesch......................... | 136/86 A |
| 2,960,558 | 11/1960 | Marsal et al...................... | 136/107 |
| 3,288,642 | 11/1966 | Kordesch......................... | 136/14 |
| 3,332,802 | 7/1967 | Clune et al. .................... | 136/107 X |
| 3,837,921 | 9/1974 | Henssen........................... | 136/86 A |
| 3,840,406 | 10/1974 | Depix............................... | 136/86 A |

Primary Examiner—Anthony Skapars
Attorney, Agent, or Firm—Kenyon & Kenyon Reilly Carr & Chapin

[57] ABSTRACT

Air depolarized electric cell comprising a negative electrode occupying a peripheral position, an electrolyte which is preferably gelled and a positive electrode mass occupying a central position within said negative electrode. The positive electrode is provided with a funnel in the center of the positive mass and with a metallic current collector disposed in the funnel in contact with walls of the funnel. The collector comprises a metallic wire in the form of a helix at least partially incrusted or embedded in the wall of the said funnel.

8 Claims, 3 Drawing Figures

*# AIR DEPOLARIZED ELECTRIC CELL

BRIEF SUMMARY OF INVENTION

The present invention concerns air depolarized electric cells and more particularly electric cells in which the intake of air is effected through a central funnel formed in the mass of the positive electrode, the latter taking up, itself, a central position in the cell.

It is already a known practice, in such electric cells, to arrange in the funnel, in contact with the walls, a perforated metallic tube which acts as a positive collector. That arrangement, although constituting an advantage in certain respects, has a few drawbacks: the aeration surfaces are limited in relation to the available lateral surface of the central funnel; the result of this is that the supplying with air of the active catalyst sites of the positive electrode is not at its optimum.

The contacts between the external lateral surface of the metallic tube and the conglomerate constituting the mass of the positive electrode have electrical resistances which are so high that the major part of the current flows out through the contacts situated at the level of the edge of the aeration holes formed on the tube.

The metal of the tube and the mass of the positive electrode have different coefficients of heat expansion; in the case of a thermal shock, breakage of the conglomerate could result therefrom.

At the time of the manufacturing of the positive electrode and more particularly at the time of drying in the oven, the mass of the conglomerate has a tendency to shrink whereas the metallic tube has a diameter which, on the contrary, increases; the result of this is cracking in the mass of the conglomerate.

Lastly, the metallic tube is an expensive element to manufacture.

The present invention makes it possible to overcome these disadvantages.

It has among its objects the provision of an air depolarized electric cell comprising a negative electrode occupying a peripheral position within a casing, an electrolyte which is preferably gelled and a positive electrode occupying a central position within said negative electrode. Said positive electrode is provided with a funnel formed in the center of the positive mass and in contact with which a metallic current collector is arranged, characterized in that the said current collector is constituted by at least one metallic wire arranged along the wall of the said funnel, being partly or totally incrusted or embedded in the positive mass.

Preferably, said wire is wound in a helical configuration inside the funnel. This wire is, at least at its surface, made of a metal which cannot be etched or attacked by the compounds in the cell; it may, for example, be made of nickel, nickel-plated copper, nickel-plated iron or an alloy such as stainless steel.

The invention will be better understood from the following description with reference to the accompanying drawing and relating to particular embodiments.

DETAILED DESCRIPTION

Figure 1:
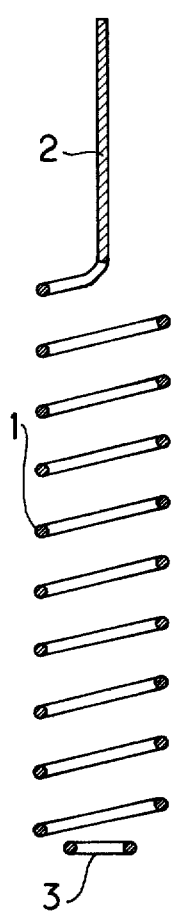
FIG. 1 shows a cutaway view of a current collector according to the invention.

FIG. 1 shows a collector 1 in the shape of a helix, according to the invention. The rectilinear part 2 at one end of said collector is intended to be connected to the positive terminal of the cell. This part 2 is in the axis of the helix and the end turn 3 has a smaller diameter than that of the other turns of the helix. According to other variants, the rectilinear part lies in a plane tangent to the helix and all the turns are identical.

Figure 2:
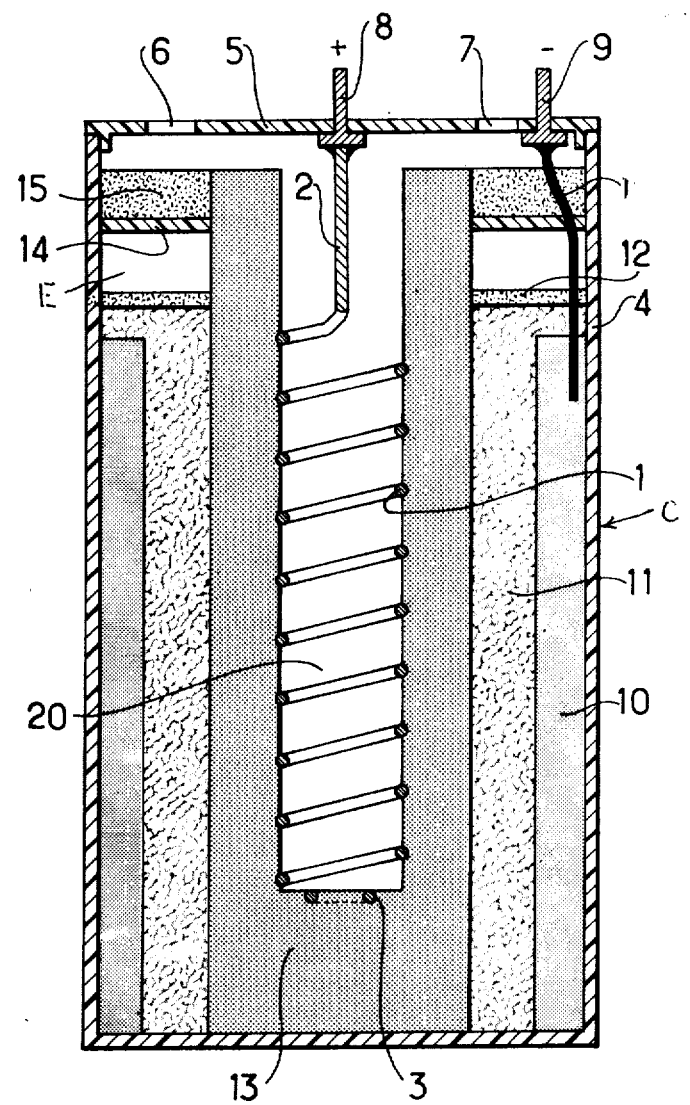
FIG. 2 shows a cutaway view of an air depolarized electric cell provided with a positive electrode according to the invention.

FIG. 2 shows a cutaway view of a cell C incorporating the described current collector 1. It comprises a casing 4 of suitable non-conductive material closed by a cover 5 provided with the two aeration holes 6 and 7 which normally are sealed off before the cell is put into service. The cover 5 also bears terminals 8 and 9, respectively positive and negative. Inside the casing 4 a tubular negative electrode 10, constituted for example by zinc powder in suspension in a potassium hydroxide and/or sodium hydroxide gel, occupies a peripheral position. The outer longitudinal surface and lower end surface of the electrode are in surface contact with the inner surface of the casing 4. An electrolyte 11 covers completely the inner tubular surface and upper end surface of the negative electrode to protect it against an undesirable intake of air. This electrolyte is constituted, for example, by a gelled sodium and/or potassium hydroxide solution and is itself protected by a directly overlying layer of gas impermeable material such as pitch 12. A second protective means is constituted, for example, by a washer 14 made of plastic material bearing an upper sealing layer of pitch 15. This means 14, 15 is situated above the electrolyte and spaced from layer 12 so as to provide an expansion space E for the negative electrode 10.

The cell C comprises, moreover, a positive electrode occupying an axially extending central position and whose positive mass 13 has a funnel or vent 20 which extends axially but not completely of the length of the electrode thus remaining closed adjacent its lowermost end. A metallic current collector 1 having a helical configuration is arranged in intimate contact with the internal wall of the funnel 20 and its end turn 3 is sunk into i.e., embedded in the positive mass of the closed or bottom end of said funnel. The individual turns of the metallic helix are partly embedded in the inner wall of the funnel 20. Such embedding may, for example, be effected during the molding of the positive mass 13. The metal helix 1 may, for example, be of nickel, nickel-plated copper, nickel-plated iron or an alloy, such as stainless steel.

The other end of helix 1 is provided with an axially extending or rectilinear part 2 joined to the numeral 8 of the cell to which it may be welded. Likewise, a current collector 16 connected to the negative electrode 10 is joined to the terminal 9 to which it may be welded.

Such an arrangement enables the inner surface of the funnel 20 to be exposed completely to contact with the air flowing into the cell via holes or openings 6, the result of this is a better supply of air to the active catalytic sites of the positive mass 13. In consequence, the cell is capable of discharging higher currents than conventional cells without any substantial lowering of its voltage.

The helical shape imparted to the collector 1 enables it to accommodate itself or follow the shrinkage or expansion of the positive mass without exerting stresses on the latter.

It has been observed, moreover, that the ohmic resistance of the positive electrode is decreased due to the closer contact of the collector turns with the mass of the conglomerate of positive mass 13 in which they are sunk.

Lastly, the collector 1 is not very expensive to manufacture.

Figure 3:
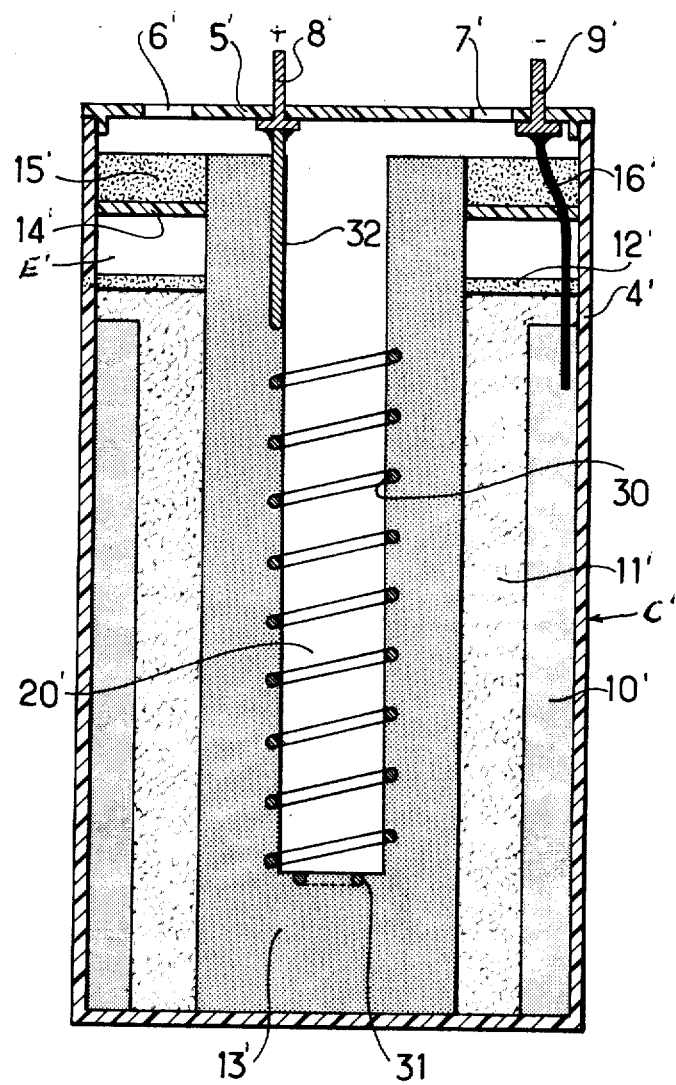
FIG. 3 shows a cutaway view of an air depolarized electric cell provided with a variant of a positive electrode according to the invention.

In the air depolarized electric cell C' shown in FIG. 3, a helical current collector 30 of similar material to that of collector 20 has its turns completely incrusted or embedded in the internal wall of the funnel or vent 20' of positive mass 13' so that this wall does not have any projecting parts, the end turn 31 is sunk into and embedded in the positive mass 13'at the bottom of said funnel, whereas an axially extending end or rectilinear part 32, tangential to the helix and also embedded in the positive mass is joined to the terminal 8' of the cell to which it can be welded. Other parts or elements in FIG. 3 bearing primed reference characters correspond to like numbered unprimed elements in FIG. 2.

Moreover, the provision of a collector 30 whose rectilinear part 32 extends tangentially to the helix enables the use of an aeration device consisting of a coaxial tube such as described in French Pat. No. 71.36.495 of Oct. 11, 1971, or by longitudinal separations according to French Pat. No. 72.30.383 of Aug. 25, 1972. These devices, by boosting the air flow in the funnel, renew effectively the intake of oxygen on the positive mass and make it possible to increase further the electrical discharge of the cell. The provision thereof is particularly easy when the inner wall of the funnel 20' is smooth, as in FIG. 3.

It must be understood that the central funnel could extend entirely right through the axial length of the positive mass. Different forms of the helix could be imparted to the collector: the latter could be constituted by a sufficiently resilient network of wires matching the walls of the funnel.

Other structural variations within the scope of the appended claims are possible and are contemplated.

There is no intention, therefore, of limitation to the exact disclosure herein presented.

What is claimed is:

1. Air depolarized electric cell comprising a negative electrode occupying a peripheral position, an electrolyte and a positive mass occupying a central position within said negative electrode, said positive electrode having a funnel located in the center of the positive mass, a metallic current collector disposed in said funnel in contact with the walls of said funnel, the said current collector comprising at least one metallic wire arranged along the wall of said funnel and at least partly embedded in the positive mass.

2. Electric cell according to claim 1, characterized in that the said metallic wire is completely embedded in the said positive mass.

3. Electric cell according to claim 2 characterized in that said wire is wound into a helical configuration forming a helix, said helix being located inside the funnel of said positive mass, the complete embedment of said wire in the internal walls of said funnel leaving said funnel free of any protuberances.

4. Electrical cell according to claim 3, characterized in that an end turn of the helix is also embedded in the positive active mass.

5. Electric cell according to claim 3, including positive and negative terminals for said cell and characterized in that an end of the helix is extended by a rectilinear part colinear with the axis of said helix and connected to the positive terminal of the electric cell.

6. Electric cell according to claim 3, including positive and negative terminals for said cell and characterized in that an end of the helix is extended by a rectilinear part, tangential to the helix and connected to the positive terminal of the electric cell.

7. Electric cell according to claim 1, characterized in that the said current collector is constituted by a helix comprised of a network of metallic wires.

8. Electric cell according to claim 1, characterized in that the said wire is at least at its surface, made of a metal selected from the group consisting of nickel, nickel-plated copper, nickel-plated iron and stainless steel.

* * * * *

UNITED STATES PATENT AND TRADEMARK OFFICE
CERTIFICATE OF CORRECTION

PATENT NO. : 3,928,072
DATED : December 23, 1975
INVENTOR(S) : Gerard Gerbier and Pierre Depoix It is certified that error appears in the above-identified patent and that said Letters Patent are hereby corrected as shown below:

Column 2, line 56, "numeral" should be ---terminal---;

Column 4, line 6, insert ---electrode--- before "mass".

Signed and Sealed this second Day of March 1976

[SEAL]

Attest:

RUTH C. MASON
*Attesting Officer*

C. MARSHALL DANN
*Commissioner of Patents and Trademarks*